US006299401B1

(12) United States Patent
Pacione

(10) Patent No.: US 6,299,401 B1
(45) Date of Patent: Oct. 9, 2001

(54) PRINTABLE FILE FOLDER

(76) Inventor: Peter L. Pacione, 6495 Tomken Road, Mississauga, Ontario (CA), L5T 1M8

( * ) Notice: Subject to any disclaimer, the term of this patent is extended or adjusted under 35 U.S.C. 154(b) by 0 days.

(21) Appl. No.: 09/209,265

(22) Filed: Dec. 11, 1998

(51) Int. Cl.[7] ............................ B42F 13/00; B65D 27/06; B32B 31/10

(52) U.S. Cl. .................................. 412/1; 283/36; 283/37; 283/41; 40/359; 40/641

(58) Field of Search ................................. 283/36, 37, 41; 40/359, 641; 412/1

(56) References Cited

U.S. PATENT DOCUMENTS

| | | | | |
|---|---|---|---|---|
| 2,052,623 | | 9/1936 | Harby | 93/1 |
| 2,450,558 | | 10/1948 | Ogren | 229/16 |
| 2,539,718 | | 1/1951 | Balzak | 197/135 |
| 3,054,202 | * | 9/1962 | Scholfield | 40/641 |
| 4,240,848 | | 12/1980 | Barber | 156/64 |
| 4,329,191 | * | 5/1982 | Barber | 283/36 |
| 4,905,393 | * | 3/1990 | Laurie | 40/641 |
| 5,016,370 | | 5/1991 | Rhian | 40/359 |
| 5,025,978 | | 6/1991 | Pacione | 229/1.5 R |
| 5,104,250 | | 4/1992 | Pacione | 402/75 |
| 5,174,606 | | 12/1992 | Hure | 281/45 |
| 5,445,468 | | 8/1995 | Pacione | 402/75 |
| 5,447,334 | | 9/1995 | Hartsock | 281/45 |
| 5,639,124 | | 6/1997 | Jung | 283/36 |

FOREIGN PATENT DOCUMENTS

| | | | |
|---|---|---|---|
| 308585 | 7/1955 | (CH) . | |
| 1449885 | 7/1965 | (FR) . | |
| 2444571 | 12/1978 | (FR) | B42F/7/04 |

* cited by examiner

*Primary Examiner*—Andrea L. Pitts
*Assistant Examiner*—Mark T. Henderson
(74) *Attorney, Agent, or Firm*—Riches, McKenzie & Herbert

(57) ABSTRACT

A blank is provided adapted for forming into a file folder. The blank comprises a planar sheet having a first surface and a second surface. The sheet has a first cover portion joined to a second cover portion along a mutual cover hinge line. The sheet is adapted for folding about the cover hinge line such that the first cover portion and second cover portion overlie each other and the folder is adapted to receive sheet material therebetween. The first cover portion includes a tab extension along one edge thereof either adjacent to the fold line or opposite thereto. The tab extension includes an inner tab portion and an outer tab portion joined together along a mutual hinge line. Folding the tab extension about the tab fold line causes the outer tab portion to overlie the inner tab portion forming a tab which extends from an edge of the first cover portion beyond the second cover portion when the second cover portion is folded to overlie the first cover portion. The inner tab portion and outer tab portion both have labelling areas on their surfaces which are adapted to have indicia printed thereon by a printing mechanism. The sheet is adapted when unfolded to be passed through a printing machine and to have labelling indicia printed on the labelling areas of both the inner tab portion and the outer tab portion. After printing, by folding the outer tab portion to overlie the inner tab portion, the outer tab portion and inner tab portion are secured together to permanently form the tab and present the printed indicia visible on both sides of the tab. The sheet carries an adhesive strip which can be activated after printing such that the adhesive strip secures the inner tab portion to the outer tab portion.

20 Claims, 9 Drawing Sheets

FIG. 1.
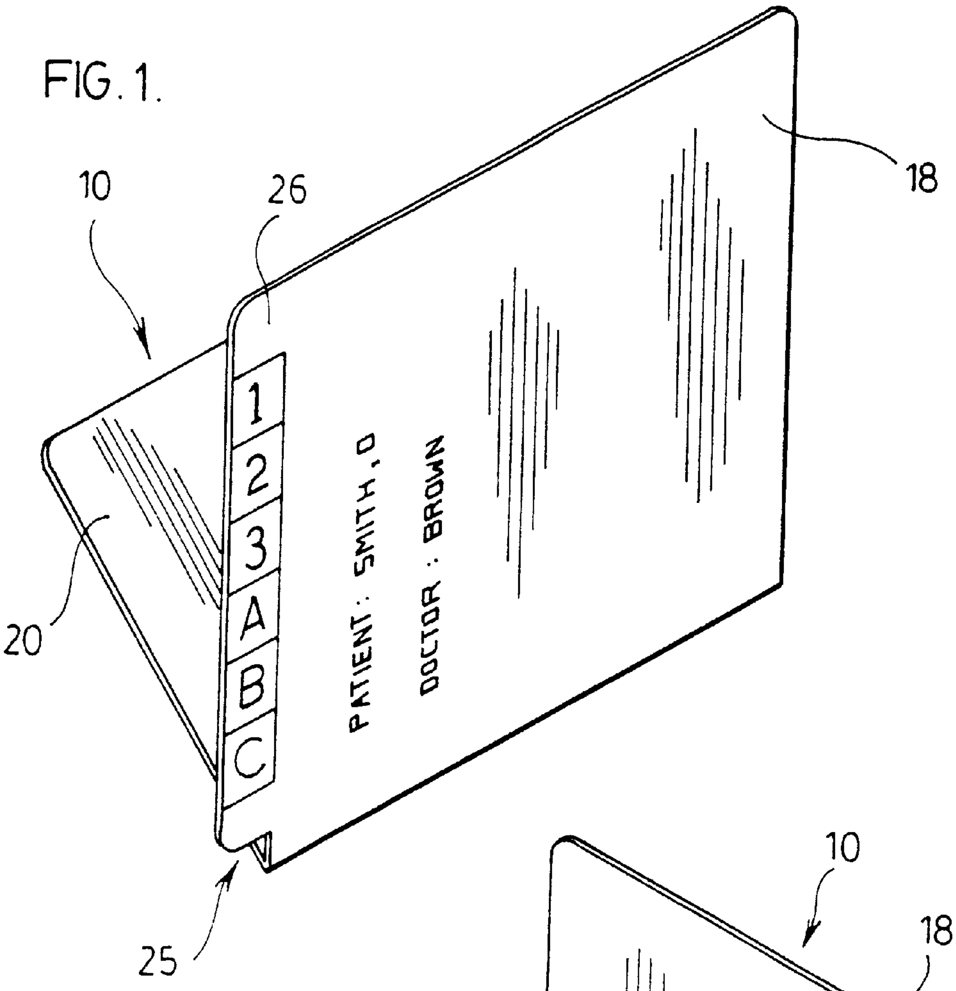
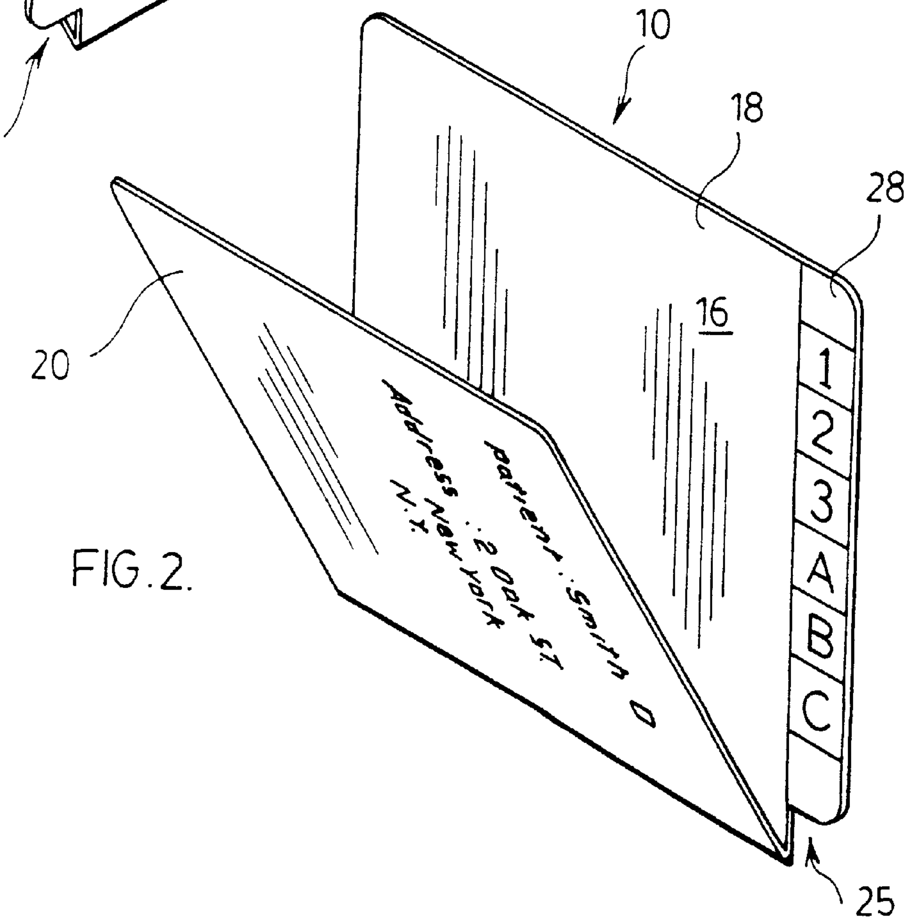
FIG. 2.

PRINTABLE FILE FOLDER

FIELD OF THE INVENTION

This invention relates to file folders with identifying tabs and, more particularly, to file folders which can be individually custom printed.

BACKGROUND OF THE INVENTION

File folders are known in which a tab extends from an end, side or top of a folder. The tab is visible when the files are positioned as in a file drawer or on a shelf. With a shelf file system, the folder is commonly referred to as an "end tab" or "side tab" folder to distinguish it from "top tab" folders typically used in drawer files.

The end tabs are labelled, preferably on both sides, with identifying information including a coding system involving the use of numbers, letters and colours. Preferred systems utilize varying sequences of colour codes such that a person looking down a row of files may readily see a colour discontinuity if a coloured file is misfiled from a particular arrangement of colour sequences. For example, the colour sequences provide wide flexibility in classification and subclassification of the files in a visually apparent sequence.

Adhesive labels are known to be applied to the tabs to provide the necessary identifying information. Known labelling systems include labels which are folded about the edge of the tab so as to provide identical information on both sides of the tab. Individual labels are provided for each number and letter appropriately colour-coded. Such labelling systems have the disadvantage that to appropriately label a tab, a user must make a selection of the correct label for a plurality of numbers and/or letters and must individually apply the labels correctly sequenced and at correct locations on the tab.

A disadvantage with known file folders is that it is difficult to place custom information on the interior and exterior surfaces of the file folder. Typically, this disadvantage is overcome as by preprinting forms on the file folder surfaces which later can individually be filled out. Again, this has the disadvantage of requiring a considerable amount of time. The file folder may be difficult to pass through conventional printers particularly when folded double or when it has adhesive labels attached to both sides of the tab which might become damaged or detached.

Rather than mark the file folder itself with information relevant to that file, frequently, information relevant to that file is printed as on a separate piece of paper which is then placed in the file or somehow attached thereto. This has the disadvantage that the information sheet can become detached from the file folder and, as well, the disadvantage that additional paper is required resulting in increased use of shelf space.

Previously known systems generally suffer the disadvantage of requiring a substantial amount of handling in order to customize any particular file. Such handling is a disadvantage, first of all, as being expensive and, secondly, being subject to error. Further, previously known systems require stocking of blank files, stocking of labels and possible separate printing of file information on separate sheets. The fact that a number of components need to be assembled renders batch processing difficult and increases the likelihood of errors arising when a number of file folders are to be created at the same time, particularly, in an environment such as in law offices, medical offices, insurance companies, government agencies and the like where significant numbers of unique individual file folders are required to be created on a regular basis.

SUMMARY OF THE INVENTION

To at least partially overcome these disadvantages of previously known devices, the present invention provides a file folder which is adapted for custom printing of identifying information on both sides of an identifying tab and a method of printing such a file folder.

An object of the present invention is to provide a file folder which can be passed through a printer and have identifying information printed on both surfaces of an identifying tab.

Another object of the present invention is to provide a method for automated custom identification of file folders by printing identifying information on two surfaces of identifying tabs.

Another object is to provide a method for automated printing of information on a file folder including information on an identification tab and information on other surfaces of the folder.

Accordingly, one aspect the present invention provides a blank adapted for forming a folder, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab hinge line therebetween wherein on folding the tab extension about the tab fold line in one direction the second surface of the sheet on the outer tab portion overlies the second surface of the sheet on the inner tab portion, wherein with the sheet folded about the cover hinge line and the tab fold line, the inner tab portion and the outer tab portion overlying the inner tab portion extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism, the second surface of a first of the inner tab portion and the outer tab portion having adhesive affixed thereto for securing the second surface of the inner tab portion and the second surface of the exterior tab portion together when the tab extension is folded in the one direction about the tab fold line, the adhesive having a removable release sheet for removal to activate the adhesive for adhesion to the second surface of a second of the inner tab portion and the outer tab portion.

A blank is provided adapted for forming into a file folder. The blank comprises a planar sheet having a first surface and a second surface. The sheet has a first cover portion joined to a second cover portion along a mutual cover hinge line. The sheet is adapted for folding about the cover hinge line such that the first cover portion and second cover portion overlie each other and the folder is adapted to receive sheet material therebetween. The first cover portion includes a tab extension along one edge thereof either adjacent to the fold line or opposite thereto. The tab extension includes an inner tab portion and an outer tab portion joined together along a mutual hinge line. Folding the tab extension about the tab fold line causes the outer tab portion to overlie the inner tab portion forming a tab which extends from an edge of the first cover portion beyond the second cover portion when the second cover portion is folded to overlie the first cover portion. The inner tab portion and outer tab portion both have labelling areas on their surfaces which are adapted to have indicia printed thereon by a printing mechanism. The sheet is adapted when unfolded to be passed through a printing machine and to have labelling indicia printed on the labelling areas of both the inner tab portion and the outer tab portion. After printing, by folding the outer tab portion to overlie the inner tab portion, the outer tab portion and inner tab portion are secured together to permanently form the tab and present the printed indicia visible on both sides of the tab. The sheet carries an adhesive strip which can be activated after printing such that the adhesive strip secures the inner tab portion to the outer tab portion.

The present invention also provides a method for automated printing of information on a file folder comprising in a single pass through a printing machine printing identifying indicia on the same surface of both the outer tab portion and the inner tab portion, thereafter activating an adhesive on the other surface of one of the inner tab portion and the other tab portion and, subsequently, securing the other surface of the inner tab portion to the other surface of the outer tab portion. At the time of printing indicia on the tab extension, other information may be printed on the same surface of the first and second cover portion.

The blank and its method of use to form a file folder in accordance with the present invention provides for advantageous automated customization of individual files including an identifying indicia, numbers, letters and/or other symbols and, particularly, colour coding of the same.

BRIEF DESCRIPTION OF THE DRAWINGS

Further aspects and advantages of the present invention will become apparent from the following description taken together with the accompanying drawings in which:

FIGS. 1 and 2 are pictorial views of the front and rear of a preferred first embodiment of a file folder in accordance with the present invention;

DETAILED DESCRIPTION OF THE DRAWINGS

Figure 4:
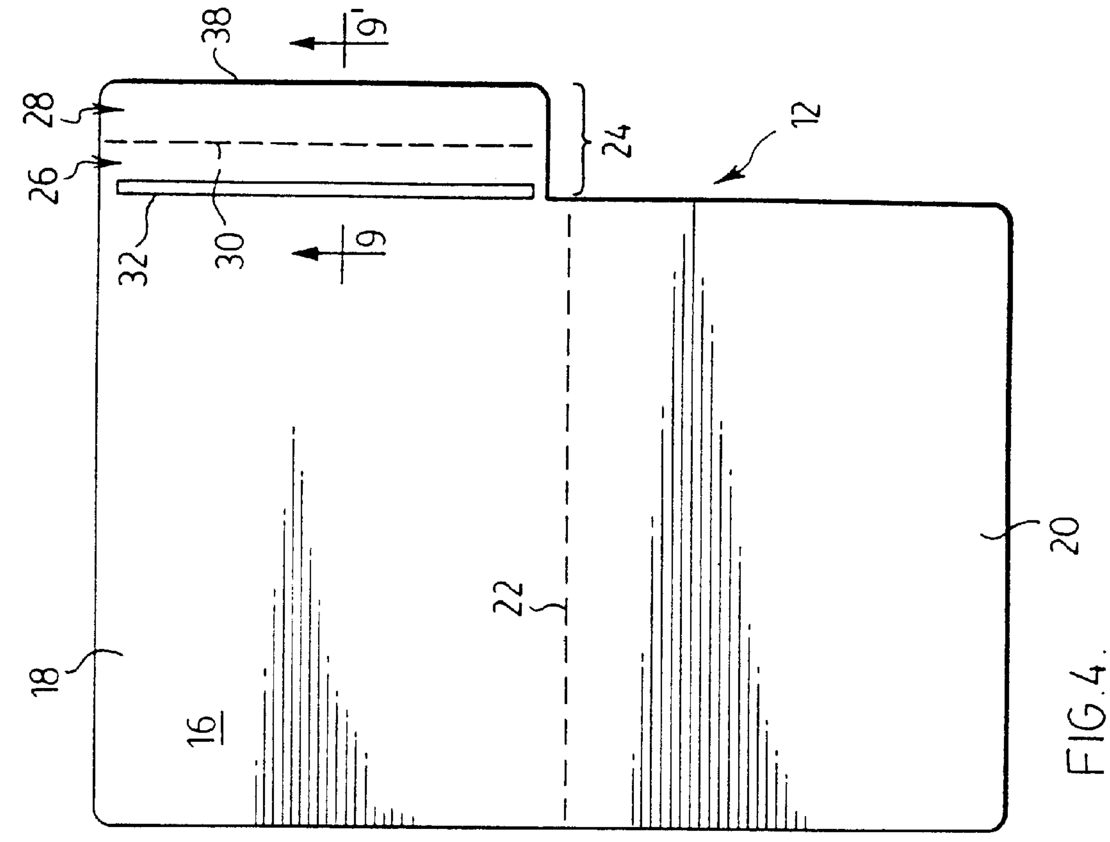
FIG. 4 is a bottom plan view of the folder blank of FIG. 3.
Figure 3:
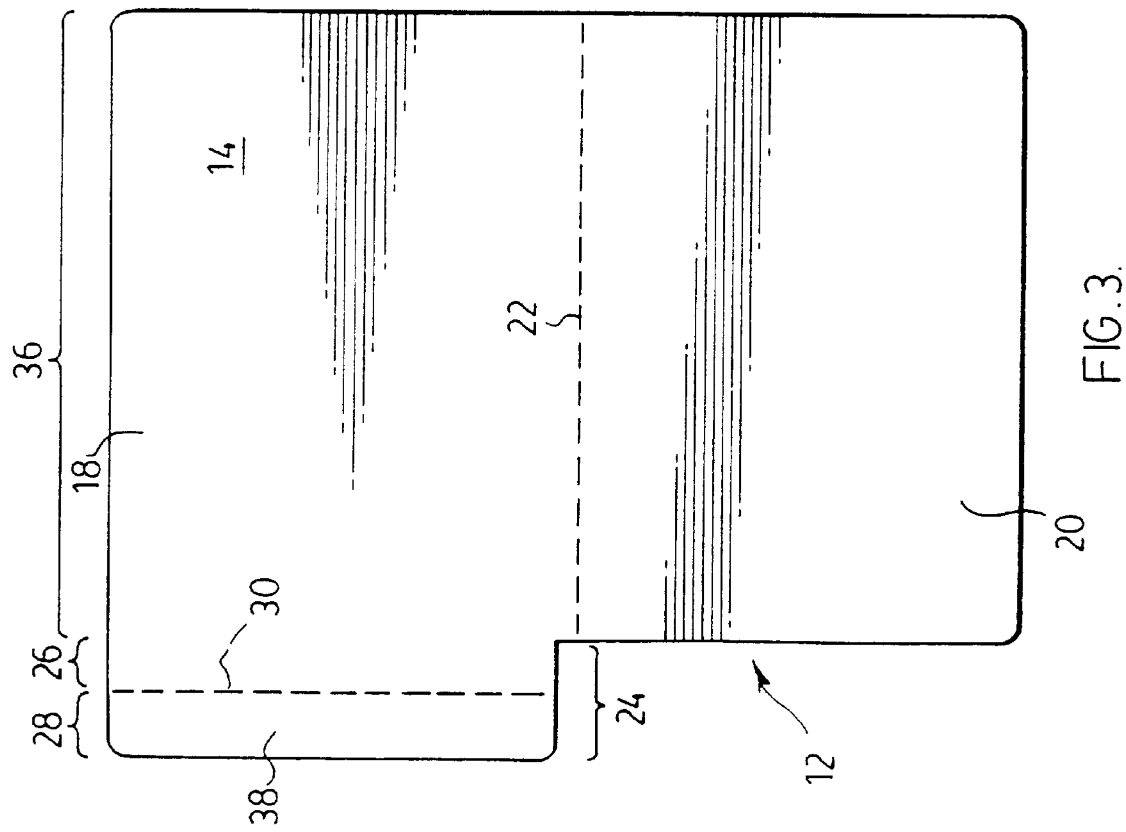
FIG. 3 is a top plan view of a first side of a folder blank in accordance with the preferred embodiment of this invention in an unfolded condition.
Figure 9:
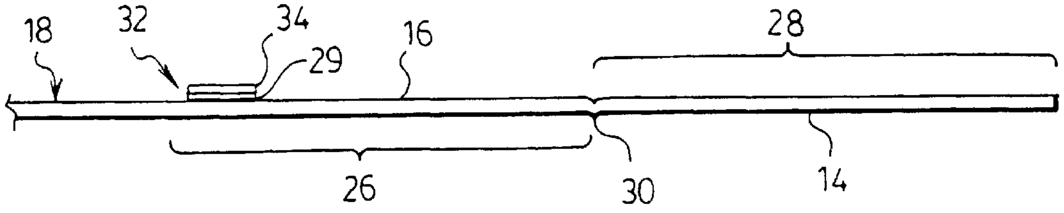
FIG. 9 is a partial cross-sectional view of the folder blank of FIG. 4 along section line 9–9'.

Reference is made first to FIGS. 1 and 2 which show a first preferred embodiment of a file folder 10 in accordance with the first aspect of the present invention. FIGS. 3 and 4 show blank or sheet 12 comprising a planar sheet of material, preferably paperboard, from which the folder 10 of FIG. 1 is made in accordance with a method of the present invention. FIG. 3 shows a plan view of a first surface 14 of the blank or sheet 12. FIG. 4 shows a plan view of the second surface 16 of the sheet 12. The sheet 12 has a first cover portion generally indicated 18 and a second cover portion generally indicated 20 joined by a fold line 22 therebetween. The first cover portion includes a tab extension 24 along one edge of the first cover portion 18. The tab extension comprises an inner tab portion 26 and an outer tab portion 28 joined by a tab fold line 30 extending therebetween. The second surface 16 of the sheet 12 carries an adhesive strip generally indicated 32. As seen in FIG. 9, the adhesive strip 32 comprises an elongate strip of adhesive material 29 permanently secured onto second surface 16 and having a release strip 34 covering its entire length. With the release strip 34 removed, the adhesive strip 32 is then activated and able to engage and permanently secure to the second surface 16 of the outer tab portion 28 when the outer tab portion 28 is folded in one direction about the tab fold line 30 so that the outer tab portion 28 overlies the inner tab portion 26.

The sheet 12 in its planar form as shown in FIG. 3 with the sheet 12 not folded about either the tab fold line or the cover fold line and thus existing as a substantially continuous planar sheet, is adapted to be passed through a printer for printing on first surface 14, preferably, in a single pass through a printer.

Figure 13:
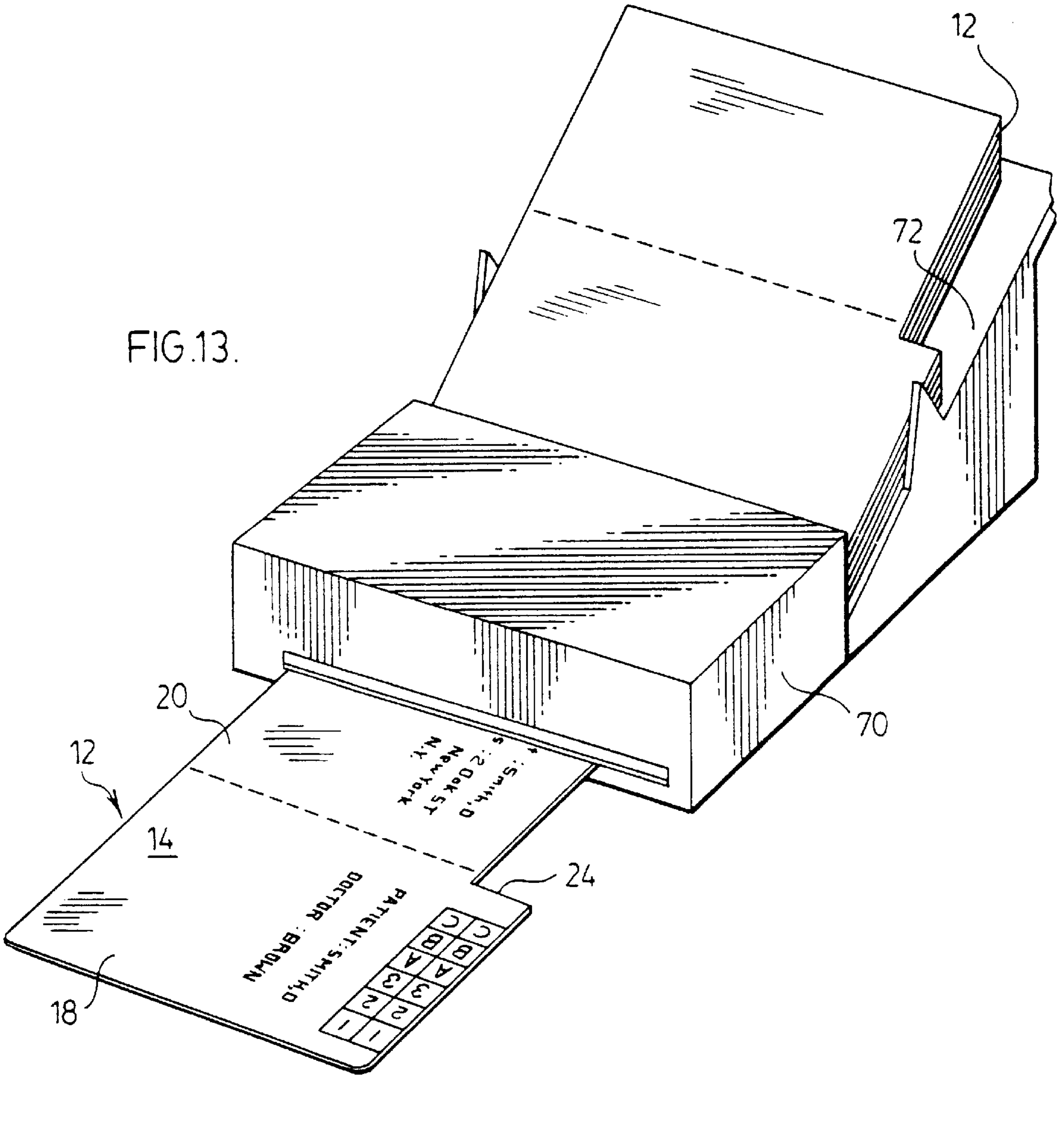
FIG. 13 is a schematic pictorial view of a printer adapted for automated printing of folder blanks in accordance with the present invention.

FIG. 13 schematically shows a desktop printer 70 having a feed sheet bin 72 to receive a plurality of the blanks 12 to feed them to the printer printing indicia on the first surface 14 of each blank 12. FIG. 13 shows a blank after having been printed exiting from the printer. The printer may be of a conventional construction as, for example, to comprise an impact printer such as a dot matrix printer or, more preferably, to comprise an ink jet or laser printer.

Preferably, the printer 70 is capable of printing colour on the blank 12. The printer is provided to be of a size such that the blank 12 can pass therethrough in a planar flat condition as shown and, therefore, the printer must have a width for passing sheet material therethrough at least equal to the least dimensional width of the blank 12. The printer may preferably have a capability to print over the entire width of the blank 12, however, may advantageously be provided, for example, to merely print over portions of the blank. Similarly, while it is desired that the printer be able to print colour, it can be satisfactory for the printer to have a capability of printing colour merely over the portion where the tab extension 24 passes therethrough.

Figure 6:
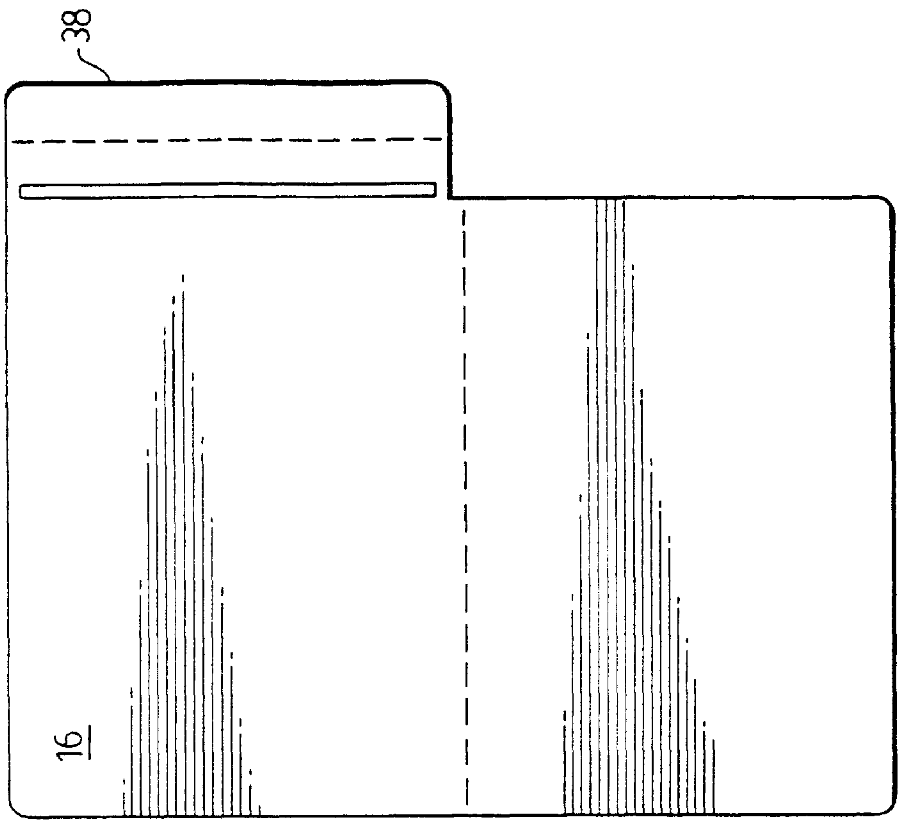
FIG. 6 shows a bottom plan view of the folder blank of FIG. 3 after printing.
Figure 5:
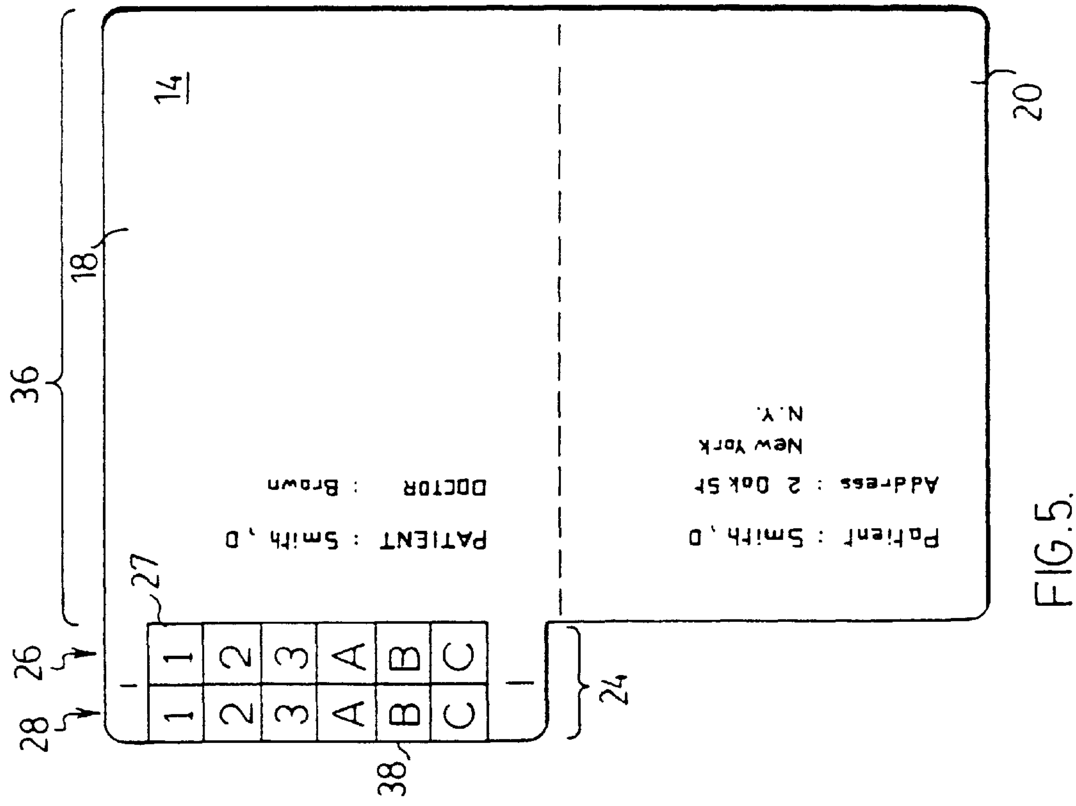
FIG. 5 shows a top plan view of the folder blank of FIG. 3 after printing.

FIGS. 5 and 6 show the blank 12 after the blank 12 has passed through the printer. As shown in FIGS. 5 and 6, there has been printing merely on the first surface 14 and no printing on the second surface 16. If printing may be desired on the second surface 16, the blank 12 may be passed through the printer inverted in a second pass.

As seen in FIG. 5, identifying indicia identified as indexing information "123ABC" has been printed both on the inner tab portion 26 and the outer tab portion 28. Each of these numbers and letters is shown in the drawings as being placed within a square 27 delineated by thin lines. Each square has its own colour and, for convenience, the drawings have not been shaded so as to show different colours. The square about each number or letter may, on the file cover, be shown as preferably different than the colour of the square for any of the other numbers. However, the square for the number 1 is, preferably, the same both on the inner tab portion 26 and on the outer tab portion 28.

The area defined by the squares containing the numbers and letters is on the inner tab portion 26 an inner labelling area and on the outer tab portion 28 an outer labelling area. These inner and outer labelling areas on the tab extension 24 are to be provided as areas on the first surface 14 which are adapted for printing and to readily receive and retain indicia printed thereon by a suitable printing machine.

FIG. 5 also shows that identifying indicia and information has been printed on the first surface 14 other than on the tab extension 24.

The first cover portion 18 may be seen as consisting of the tab extension 24 and, in addition, a remaining substantially rectangular portion generally indicated 36. The generally rectangular portion 36 has four edges with the fold line 22 forming one edge. The extension tab 24 of the first embodiment is provided on an edge of the rectangular portion 36 adjacent the fold line 22. The tab extension 24 extends from an edge of the rectangular portion 36 with the inner tab portion 26 separating the outer tab portion 28 from the remaining rectangular portion 36 of the first cover portion 18. The outer tab portion 28, in effect, forms the distal end and an edge of the tab extension 24.

Figure 8:
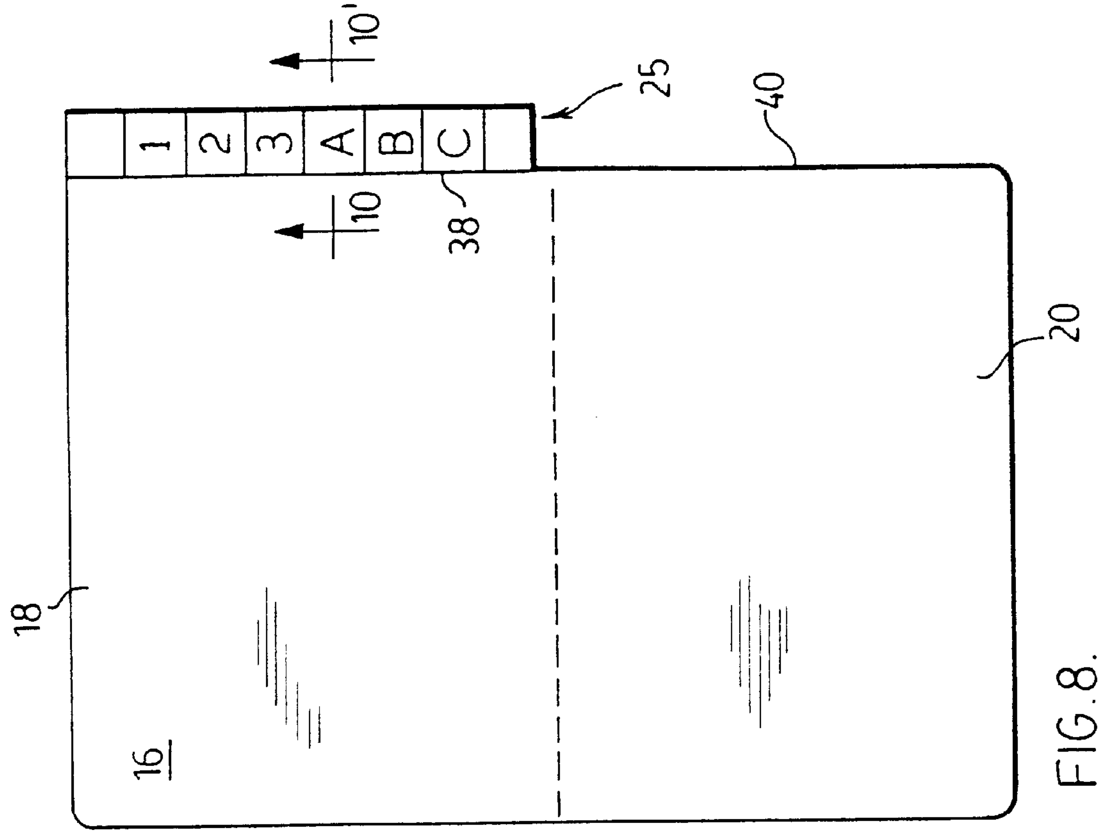
FIG. 8 shows a bottom plan view of the folder blank of FIG. 5 after the tab extension has been folded.

As shown in the first embodiment, the outer tab portion 28 and the inner tab portion 26 have a substantially identical shape and appearance such that when folded about the tab fold line 30, as seen in FIGS. 1 and 8, the inner tab portion 26 and outer tab portion 28 overlie each other and are substantially coextensive with each other.

FIG. 5 shows identifying indicia and other information printed on areas of the first surface 14 over the rectangular portion 36 of the first cover portion 18 and, as well, on areas of the first surface 14 over the second cover portion 20. Such information may comprise any information which would be useful and either unique to the individual file or forming possibly a blank form including spaces to be filled out after the blank 12 has been printed.

A blank 12, after printing, as shown in FIGS. 5 and 6, is further processed by having the release strip 34 removed so as to activate the adhesive strip 32. The tab extension 24 is then folded along fold line 30 in one desired direction so as to place the second surface 16 of the outer tab portion 28 into overlying opposing relation with the second surface 16 of the inner tab portion 26. With the second surface 16 of the outer tab portion 28 engaged by the adhesive strip 32, the outer tab portion 28 and the inner tab portion 26 are secured together.

Figure 7:
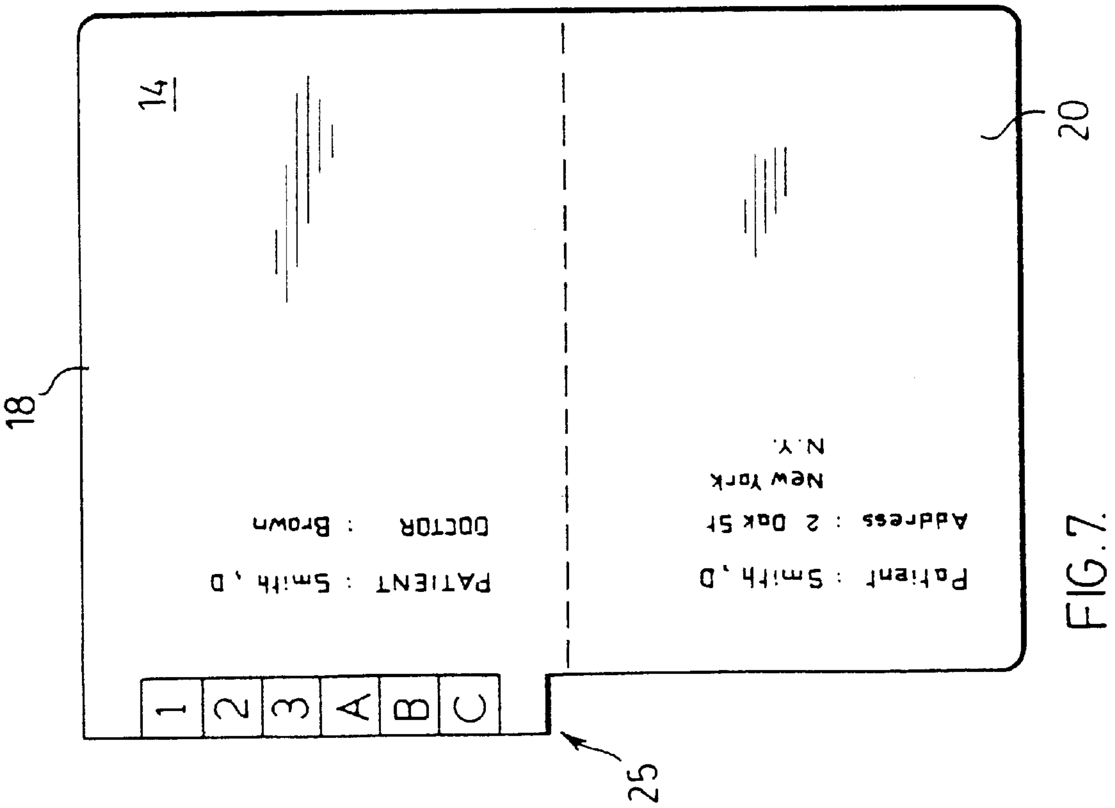
FIG. 7 shows a top plan view of the folder blank of FIG. 5 after the tab extension has been folded.

FIGS. 7 and 8 show both sides of the blank 12 after the outer tab portion 28 has been secured to the inner tab portion 26. For further use, the blank may be folded about its fold line 22 so as to be adapted to receive sheet material between the first cover portion 18 and the second cover portion 20. As apparent in FIGS. 7 and 8 and seen in FIGS. 1 and 2, the tab 25 extends beyond the first and second cover portions. Thus, both the inner tab portion 26 and the outer tab portion 28 overlying the inner tab portion extend from the first cover portion 18 beyond the edge 40 of the second cover portion 20.

FIGS. 1 and 2 show a preferred embodiment in which the first cover portion 18 and second cover portion 20 are folded in a direction about the cover fold line 22 such that the second surface 16 of the first cover portion 18 is opposed to the second surface 16 of the second cover portion 20. In this configuration, as illustrated in FIGS. 1 and 2, the printed material printed on the first surface 14 of the first cover portion and second cover portion other than on the tab extension, comprise outside surfaces of the file folder.

The file folder could be folded in the other direction about the cover fold line 22 such that the first surface 14 over the first cover portion and the first surface 14 over the second cover portion are in opposition in the inside of the file folder and present the printed material on the inside of the file folder.

In any case, folding the blank 12 about the cover fold line in either direction provides a tab 25 with indicia on the tab 25 which is visible from both the front or the back.

As shown in FIGS. 1 and 2 with the outer tab portion 28 folded inwardly towards the inside of the file folder between the covers, there is the reduced likelihood that on sliding the file folder 10 in and out on a shelf supported by the fold that the edge 38 of the outer tab portion 28 may become caught on adjacent files and the like.

The blank 12 may comprise any sheet material, preferably having some stiffness and preferably comprising a sheet of paperboard material as is conventional for most file folders. The materials from which conventional paperboard folders are provided are adequate for printing in most printing machines. To the extent that all of the blanks are made from the same colour paperboard then, when colour may be printed, it would be expected that the various individual colours would have the same hue. Advantageously, light coloured and, preferably, white covers may be provided when colour is desired to be printed on the tab extension so as to provide consistent quality colours of varying desired hues.

Figure 10:
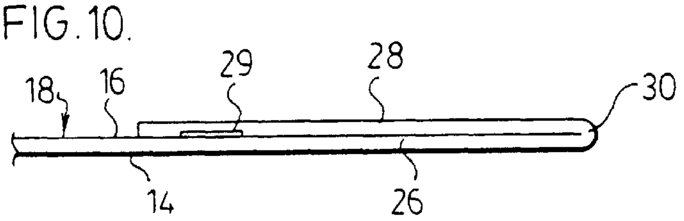
FIG. 10 is a partial cross-sectional view through the folder blank of FIG. 8 along section line 10–10'.

FIGS. 9 and 10 show cross-sectional views through the tab extensions of FIGS. 4 and 8 showing simple paperboard.

Figure 11:
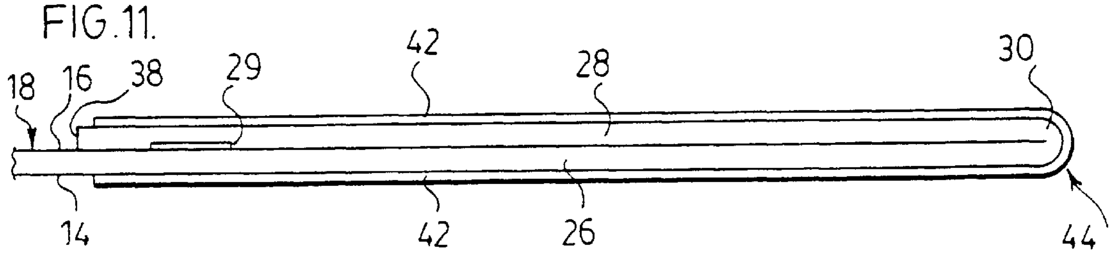
FIG. 11 shows a cross-sectional view similar to that of FIG. 10, however, of another embodiment of the invention in which a reinforcing layer is applied to one surface of the tab extension.

FIG. 11 is an enlarged cross-sectional view identical to that shown in cross-section of FIG. 10, however, of a modified embodiment. In FIG. 11, a thin layer 42 of material is laminated onto the first surface 14 of the tab extension overlying portions of both the inner tab portion 26 and the outer tab portion 28. As shown in FIG. 11, the layer 42 extends over the tab fold line 30 about the outer fold edge 44. The layer 42 preferably is a thin material such as Mylar which is laminated to the first surface 14 of the blank. The layer 42 may serve a number of purposes. Firstly, it may provide a surface which advantageously permits printing thereon as by a printer. Printing may be enchanced by the nature of the surface being adapted to receive printings and the like permanently and against smudging. Printing may also be enhanced by the layer 42 being adapted to receive and present colours of ink printed thereon so as to have a constant hue. The layer 42 may also be of a constant colour such as, for example, white so as to provide a constant colour background and improve the hue of colours printed thereon.

The layer 42 may also comprise a reinforcing material to assist in strengthening the resultant tab 25 formed by the tab extension 24. While the layer 42 is shown merely on the tab extension 24, it is to be appreciated that it could extend over adjacent portions of the rectangular portion 36 of the first cover portion to also assist in reinforcing the same.

Figure 12:
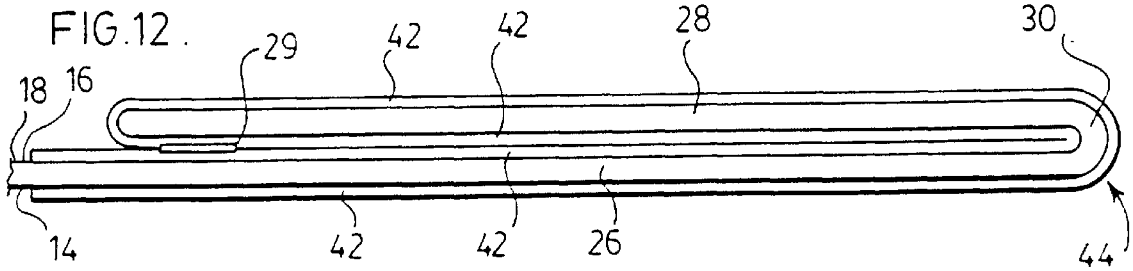
FIG. 12 is a cross-sectional view similar to that of FIG. 10, however, of a further embodiment in which a reinforcing layer is applied to both sides of the tab extension.

FIG. 12 shows a cross-sectional view similar to FIG. 11 but of yet another embodiment in which the layer 42 is applied to both the first surface 14 and the second surface 16 of the tab extension and layer 42 extends inwardly past the resultant tab onto the first cover portion 18. While FIG. 12 would appear to have the layer 42 substantially increase the thickness of the resultant tab, it is to be appreciated that layer 42 can be a very thin yet strong laminate and provide a substantial reinforcing structure. In the context of FIG. 12, the adhesive 29 is shown as being secured on top of the layer 42 and to therefore provide a bond between the layer 42 on the inner tab portion 26 and the layer 42 on the outer tab portion 28. Layer 42 can serve the purpose of being a layer which provides for superior adhesion of the adhesive strip.

A file folder in accordance with the present invention is readily adapted for use in a system for automated printing of the file folders including a printer 70 such as shown in FIG. 13 controlled by a computer system. An operator can direct a computer system to appropriately print the next file in any sequence with any desired information to be printed on the file. The file can be printed by the printer and after printing, there is merely the requirement of folding the tab extension and securing the tab extension in place.

Figure 14:
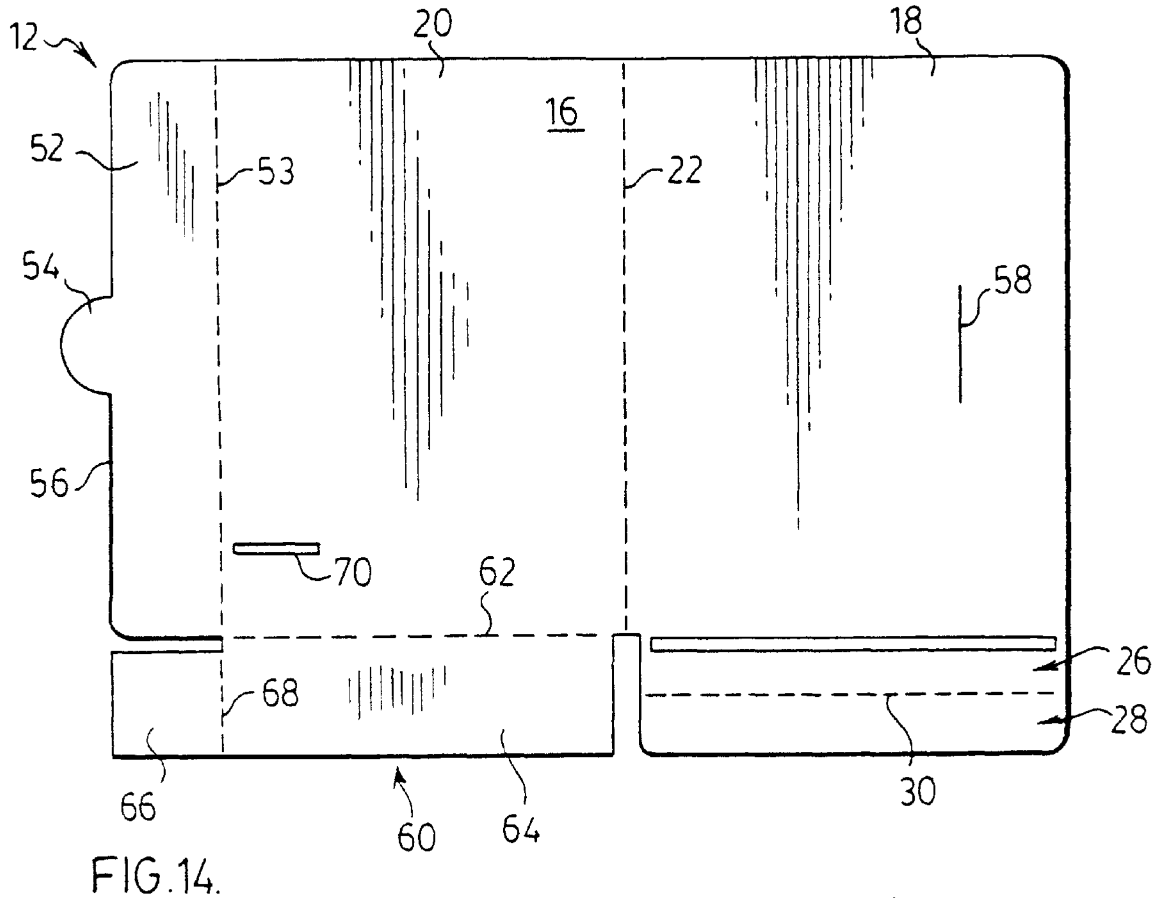
FIG. 14 is a bottom plan view of a folder blank in accordance with a second embodiment of the present invention.
Figure 15:
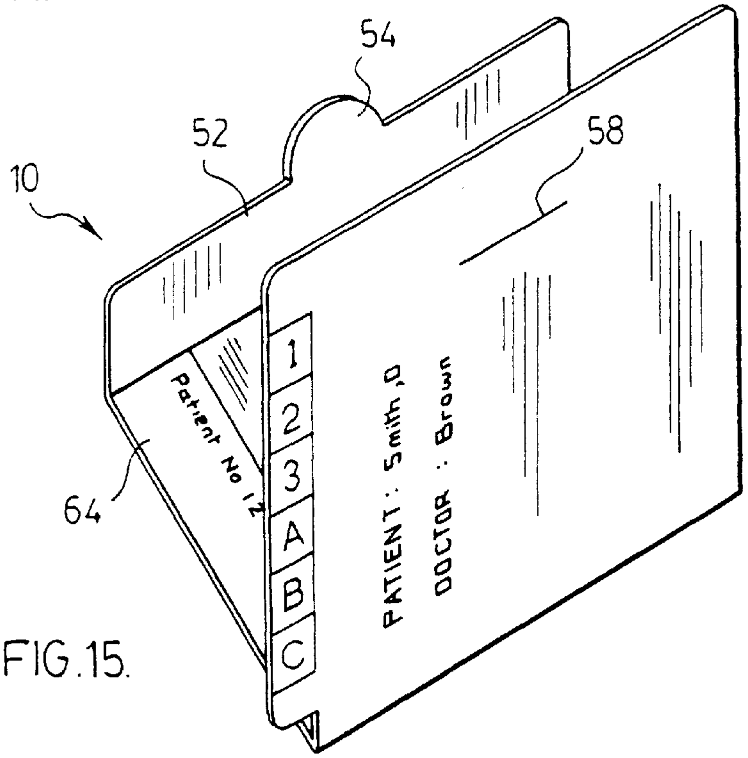
FIG. 15 is a pictorial view of a folder made from the blank shown in FIG. 14.

Reference is now made to FIG. 14 which shows a bottom view of a second embodiment of a blank 12 adapted for use with the method of the present invention to produce a folder 10 as shown in FIG. 15. The blank 12 of FIG. 14 is identical to the blank shown in FIG. 4 with the following exceptions.

Firstly, a third cover portion 52 is provided connected to the second cover portion 20 and joined by an extension fold line 53. The cover portion 52 includes a closure extension 54 on its outer edge 56. First cover portion 18 has a closure slot 58 cut therethrough. The blank 12 is adapted to be folded with the third cover portion 20 to overlie the first cover portion 18 with closure extension 54 engaged in closure slot 58.

Secondly, a pocket extension 60 is provided connected to the second cover portion 20 and joined by a pocket fold line 62. The pocket extension 60 includes pocket front portion 64 and pocket support portion 66 joined by support fold line 68. A pocket adhesive strip 70 is provided on second surface 16 to engage the first surface of the pocket support portion 66. Pocket support portion 66 is folded about fold line 68 so that its second surface 16 overlies pocket front portion 64. Next, the pocket front portion 64 is folded about hinge line 62 so that the first surface of the pocket support portion 66 engages pocket adhesive strip 70, thus, in effect, forming a pocket to receive sheet material intermediate second surface 16 of the pocket front portion 64 and second surface 16 of the second cover portion 20. Information printed on the first surface of the pocket front portion 64 is visible inside a folder when folded as shown in FIG. 15.

Figure 16:
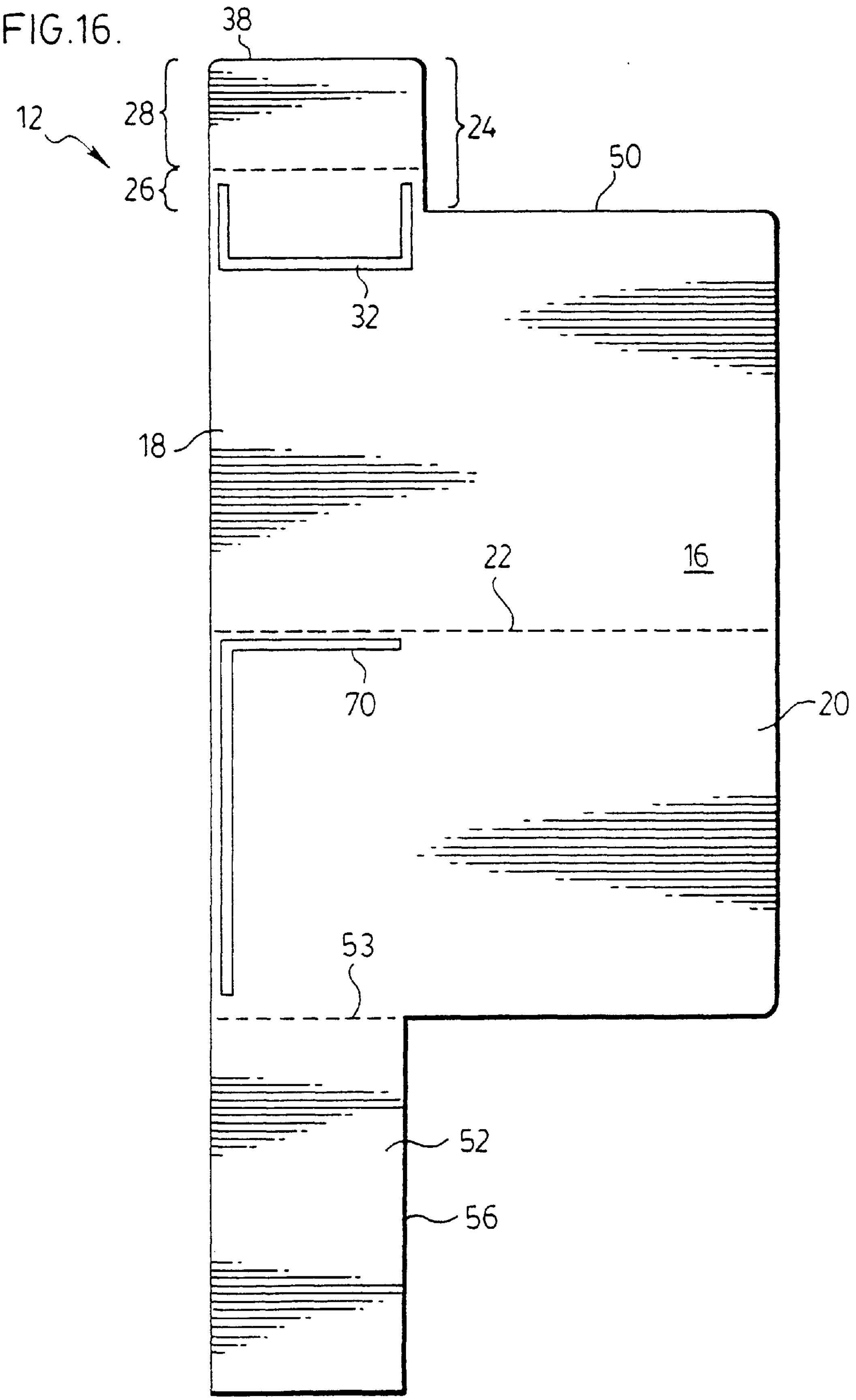
FIG. 16 is a bottom plan view of a folder blank in accordance with a third embodiment of the present invention.
Figure 17:
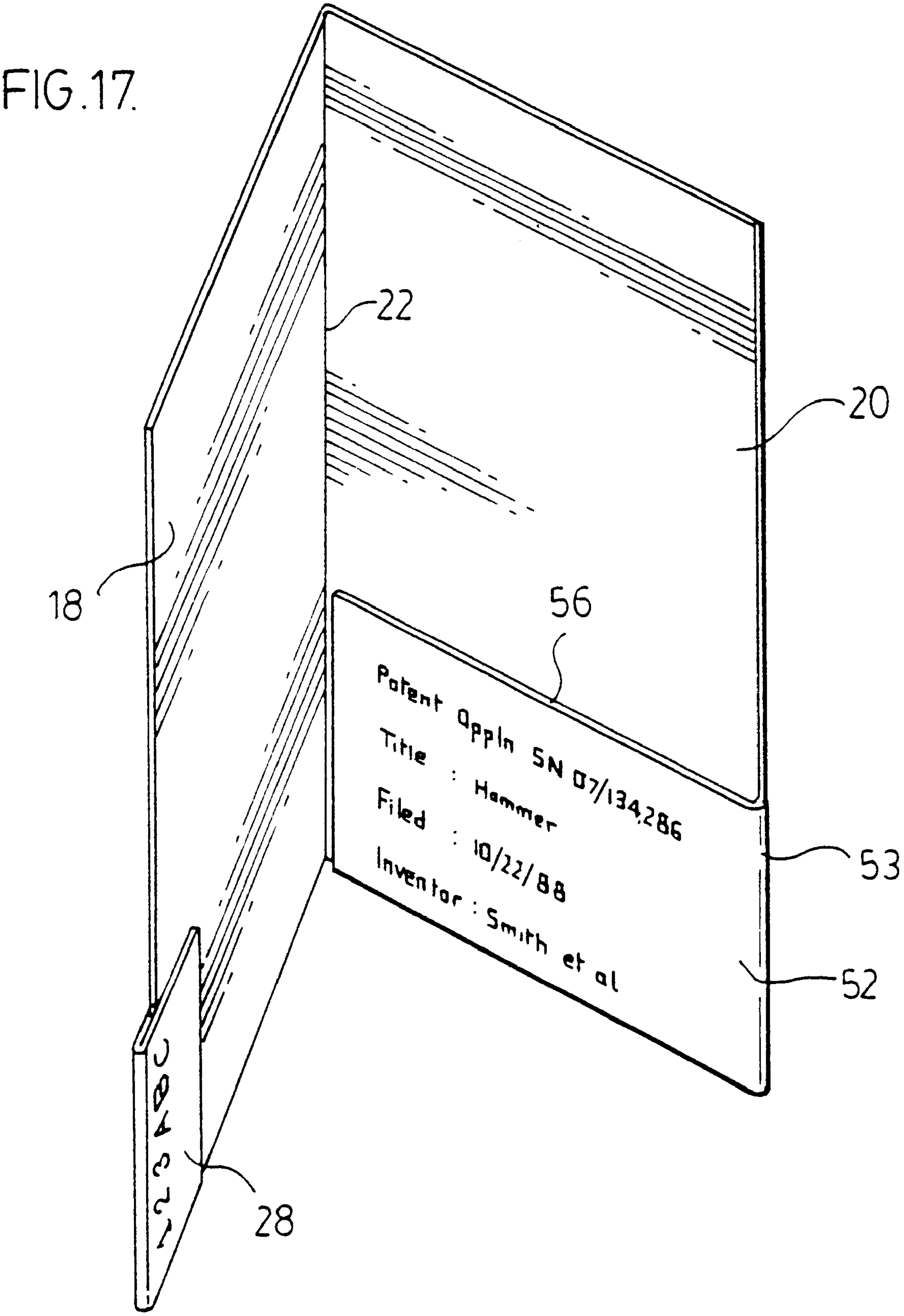
FIG. 17 is a pictorial view of a folder made from the blank shown in FIG. 16.

Reference is now made to FIG. 16 which shows a bottom plan view of a third version of a blank 12 adapted for use in accordance with the method of the present invention to provide a folder 10 as seen in FIG. 17. The blank 12 shown in FIG. 16 is labelled with reference numerals having correspondence to the reference numerals used in the other Figures in respect of the corresponding parts. The blank 12 similarly has a first cover portion 18 and a second cover portion 20 joined by a fold line 22. A tab extension 24 is provided on an edge 50 of the first cover portion opposite from the fold line 22. The tab extension has an inner tab portion 26 and an outer tab portion 28. The outer tab portion 28 is formed of a size larger than the inner tab portion 26 such that when the outer tab portion is folded over the inner tab portion, the edge 38 of the outer tab portion extends farther inwardly than the inner tab portion 26 and, therefore, extends beyond the edge 50. The adhesive strip 32 is shown as provided in a U-shape, portions of which are inward of the edge 50.

A third cover portion 52 is provided connected to the second cover portion 20 and joined by a fold line 53. A second adhesive strip 70 is provided in a U-shape on the second cover portion 20 such that when the third cover portion 52 is folded along the fold line 53, the third cover portion 52 may be secured over the second cover portion 20 and form a pocket with an opening adjacent the edge 56. FIG. 16 shows the second surface 16 of this blank 12. It is to be appreciated that the other side, not shown, may be printed with information and, for example, that information on the first surface 14 where it overlies the third cover portion 52 would appear on top of the pocket and the pocket would be disposed inside the file folder, assuming the file folder is folded about the cover fold line 22 to replace the second surface 16 of the first and second cover portions in opposition as shown in the folder 10 in FIG. 17.

The present invention has been described with particular reference to the file cover comprising paperboard. It is to be appreciated that paper of various paper weights can be used such as paper of thickness in the range of about 8 to 15 microns, more preferably, 10 to 13 microns, also referred to as 10 to 13 point paper. Preferably, the file folder will have some stiffness. The file folder could, for example, comprise relatively thin plastic material, vinyl, paperboard, cardboard, manilla paper, paper coated with plastic and the like.

The file folder shown in the preferred embodiments have a single fold line. It is to be appreciated that the fold line may comprise a plurality of fold lines such that, in use, the file folder may be folded so as to have a gussett of appropriate thickness to assist in receiving sheet material of desired thickness therein.

The preferred embodiments show as the adhesive a layer of adhesive having a suitable release sheet. Such systems are preferred. The release sheets have, surprisingly, been found to pass through conventional printers without becoming dislodged yet can be relatively easily removed by a user to activate the adhesive. Other adhesive systems could be utilized which may pass through a printer yet may be activated, preferably manually, after printing. Rather than provide the adhesive on the blank prior to printing, it is within the scope of the present invention to apply an adhesive after printing which would serve to secure the outer tab portion to the inner tab portion when they are folded together. A suitable mechanical apparatus could be developed so as to receive a blank after printing, apply the adhesive and to then fold the outer tab portion over the inner tab portion.

While the invention has been described with reference to preferred embodiments, many modifications and variations will now occur to persons skilled in the art. For a definition of the invention, reference is made to the appended claims.

I claim:

1. A blank adapted for forming a folder, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab fold line therebetween wherein on folding the tab extension about the tab fold line in one direction the second surface of the sheet over the outer tab portion overlies the second surface of the sheet over the inner tab portion, wherein with the sheet folded about the cover hinge line and the tab fold line, the inner tab portion and the outer tab portion overlying the inner tab portion both extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism, the second surface of a first of the inner tab portion and the outer tab portion having adhesive affixed thereto for securing the second surface of the inner tab portion and the second surface of the exterior tab portion together when the tab extension is folded in the one direction about the tab fold line, the adhesive having a removable release sheet for removal to activate the adhesive for adhesion to the second surface of a second of the inner tab portion and the outer tab portion, wherein said first cover portion consists of the tab extension and a remainder of the first cover portion, the remainder of the first cover portion being generally rectangular with four edges, the hinge line forming one of said four edges and the tab extension extending outwardly from the rectangular remainder as an extension from one of the other three edges.

2. A blank as claimed in claim 1 including a thin layer of reinforcing material secured over portions of the inner and outer tab portions to reinforce the tab extension.

3. A blank as claimed in claim 1 including a thin layer of material secured over the inner and outer labelling areas, the thin layer providing an outer surface adapted to have indicia printed thereon by a printing mechanism.

4. A blank as claimed in claim 1 wherein said sheet comprises paperboard.

5. A blank as claimed in claim 1 wherein the inner tab portion connects the outer tab portion to the rectangular remainder and the inner tab portion separates the outer tab portion from the rectangular remainder.

6. A blank as claimed in claim 1 including a third cover portion joined to the second cover portion along a mutual additional hinge line therebetween wherein on folding the sheet about the additional hinge line, the third cover sheet overlies the second cover sheet.

7. A blank as claimed in claim 2 wherein the reinforcing material is provided on the first surface of the tab extension and extends from the inner tab portion to the outer tab portion across the fold line.

8. A blank as claimed in claim 7 wherein said thin layer of reinforcing material extends over the inner and outer labelling areas, the thin layer providing an outer surface adapted to have indicia printed thereon by a printing mechanism.

9. A blank as claimed in claim 7 wherein the reinforcing layer of material is provided on both the first surface and the second surface of the tab extension extending about an edge of the outer tab portion from the first surface of the sheet to the second surface of the sheet.

10. A blank as claimed in claim 3 wherein said thin layer of material provides a surface upon which colours can be printed with the colours to appear the same colour hue independent of a colour of the sheet.

11. A blank as claimed in claim 5 wherein said inner tab portion and outer tab portion are substantially of the same size and shape such that the inner tab portion and outer tab portion are coextensive when the tab extension is folded about the tab fold line.

12. A blank as claimed in claim 5 wherein said outer tab portion is of a larger size than the inner tab portion whereby when the tab extension is folded about the tab fold line the outer tab portion overlies the inner tab portion and portions of the rectangular remainder adjacent the inner tab portion.

13. A blank as claimed in claim 6 wherein the second surface of a first of the second cover portion and the third cover portion having adhesive means affixed thereto for securing the second surface of the second cover portion and the second surface of the third cover portion together when the third cover portion is folded about the additional hinge line whereby the third cover portion forms a pocket on the second cover portion.

14. A blank adapted for forming a folder, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab fold line therebetween wherein on folding the tab extension about the tab fold line in one direction the second surface of the sheet over the outer tab portion overlies the second surface of the sheet over the inner tab portion, wherein with the sheet folded about the cover hinge line and the tab fold line, the inner tab portion and the outer tab portion overlying the inner tab portion both extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism, the second surface of a first of the inner tab portion and the outer tab portion having adhesive affixed thereto for securing the second surface of the inner tab portion and the second surface of the exterior tab portion together when the tab extension is folded in the one direction about the tab fold line, the adhesive having a removable release sheet for removal to activate the adhesive for adhesion to the second surface of a second of the inner tab portion and the outer tab portion, including a cover labelling area on a first surface of the sheet over one of the first cover portion and the second cover portion adapted to have indicia printed thereon by a printing means.

15. A blank adapted for forming a folder, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab fold line therebetween wherein on folding the tab extension about the tab fold line in one direction the second surface of the sheet over the outer tab portion overlies the second surface of the sheet over the inner tab portion, wherein with the sheet folded about the cover hinge line and the tab fold line the inner tab portion and the outer tab portion overlying the inner tab portion both extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism, the second surface of a first of the inner tab portion and the outer tab portion having adhesive affixed thereto for securing the second surface of the inner tab portion and the second surface of the exterior tab portion together when the tab extension is folded in the one direction about the tab fold line, the adhesive having a removable release sheet for removal to activate the adhesive for adhesion to the second surface of a second of the inner tab portion and the outer tab portion, wherein said cover hinge line comprises a first edge of the first cover portion, the first cover portion having a second edge on an opposite side of the first cover portion to the cover hinge line, the tab extension being provided along the second edge.

16. A blank as claimed in claim 15 including a thin layer of reinforcing material secured over portions of the inner and outer tab portions to reinforce the tab extension, the reinforcing material is provided on the first surface of the tab extension and extends from the inner tab portion to the outer tab portion across the fold line, said thin layer of reinforcing material extends over the inner and outer labelling areas, the thin layer providing an outer surface adapted to have indicia printed thereon by a printing mechanism.

17. A blank as claimed in claim 15 including a thin layer of material secured over the inner and outer labelling areas, the thin layer providing an outer surface adapted to have indicia printed thereon by a printing mechanism, said thin layer of material provides a surface upon which colours can be printed with the colours to appear the same colour hue independent of a colour of the sheet.

18. A blank adapted for forming a folder, the blank comprising substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab fold line therebetween wherein on folding the tab extension about the tab fold line in one direction the second surface of the sheet over the outer tab portion overlies the second surface of the sheet over the inner tab portion, wherein with the sheet folded about the cover hinge line and the tab fold line, the inner tab portion and the outer tab portion overlying the inner tab portion both extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism, the second surface of a first of the inner tab portion and the outer tab portion having adhesive affixed thereto for securing the second surface of the inner tab portion and the second surface of the exterior tab portion together when the tab extension is folded in the one direction about the tab fold line, the adhesive having a removable release sheet for removal to activate the adhesive for adhesion to the second surface of a second of the inner tab portion and the outer tab portion, wherein said cover hinge layer comprises a first edge of the first cover portion, the first cover portion having a second edge adjacent the first edge, the tab extension being provided along the second edge.

19. A blank as claimed in claim 18 including a thin layer of reinforcing material secured over portions of the inner and outer tab portions to reinforce the tab extension, the reinforcing material is provided on the first surface of the tab extension and extends from the inner tab portion to the outer tab portion across the fold line, said thin layer of reinforcing material extends over the inner and outer labelling areas, the thin layer providing an outer surface adapted to have indicia printed thereon by a printing mechanism.

20. A blank as claimed in claim 18 including a thin layer of material secured over the inner and outer labelling areas, the thin layer providing an outer surface adapted to have indicia printed thereon by a printing mechanism, said thin layer of material provides a surface upon which colours can be printed with the colours to appear the same colour hue independent of a colour of the sheet.

* * * * *